United States Patent
Ono et al.

(10) Patent No.: US 7,164,792 B2
(45) Date of Patent: Jan. 16, 2007

(54) METHOD AND APPARATUS FOR COMPRESSING IMAGES USING COLOR PALETTES AND RARE COLORS

(75) Inventors: Tarik Ono, San Francisco, CA (US); Benjamin Hebert, Palo Alto, CA (US); Thomas G. O'Neill, Mountain View, CA (US); Jordan Slott, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 736 days.

(21) Appl. No.: 10/386,745

(22) Filed: Mar. 11, 2003

(65) Prior Publication Data

US 2004/0179731 A1   Sep. 16, 2004

(51) Int. Cl.
*G06K 9/00* (2006.01)
(52) U.S. Cl. ........................ 382/166; 382/162; 382/232
(58) Field of Classification Search ................ 382/166, 382/162, 232; 345/601, 549; 386/52, 111, 386/109, 112; 358/1.9; 712/300
See application file for complete search history.

(56) References Cited

U.S. PATENT DOCUMENTS

| 4,937,739 A | * | 6/1990 | Ernst et al. ............... 712/300 |
| 5,046,025 A | * | 9/1991 | Harper et al. ............. 345/601 |
| 5,122,949 A | * | 6/1992 | Harper et al. ............. 358/1.9 |

\* cited by examiner

*Primary Examiner*—Anh Hong Do
(74) *Attorney, Agent, or Firm*—Park, Vaughan & Fleming, LLP; Edward J. Grundler

(57) ABSTRACT

A system for compressing an image. The system determines a set of commonly occurring color values in the image and associates a designator with each commonly occurring color value. For each pixel in the image, the system identifies a color value for the pixel. If the pixel has a commonly occurring color value, the system substitutes the associated designator for the commonly occurring color value. Otherwise, if the pixel does not have a commonly occurring color value, the system adds the color value to a rare color list, and substitutes a special designator for the color value to indicate that the color value for the pixel is contained in the rare color list.

24 Claims, 3 Drawing Sheets

METHOD AND APPARATUS FOR COMPRESSING IMAGES USING COLOR PALETTES AND RARE COLORS

BACKGROUND

1. Field of the Invention

The present invention relates to techniques for compressing images. More specifically, the present invention relates to a method and an apparatus that facilitates fast, lossless image compression using color palettes.

2. Related Art

Modern computing applications typically process image data. For example, remote computing applications allow screen information that is generated generated on one computer—the host computer—to be transmitted and displayed on another computer—the display computer. These display computers can include a multipurpose computer, an X-terminal, a thin client, or a personal digital assistant (PDA). The latter three are limited-purpose computers that may have no hard drive, have limited computing capabilities, and are designed for only remote computing applications.

The communication between the host and display computers can occur over any sort of network connection (e.g. Ethernet, wireless). The number of bits that can be sent per second on a network connection is the "network bandwidth" of that network connection. This network bandwidth is limited mainly by two factors: (1) the physical composition of the network, and (2) the communication protocol used on the network (i.e. TCP/IP). If the network is a shared network, the network bandwidth available to an individual computer is further limited by the network bandwidth used by the other computers on the network.

Remote computer applications typically have a minimum network bandwidth requirement. If the network bandwidth available on the network connection falls below this minimum, the application either ceases functioning entirely or the user experience becomes unacceptable. Reducing the minimum network bandwidth required by a remote computer application thus has two beneficial effects: (1) the application is usable in networks with less network bandwidth available; and (2) more devices can share the same network bandwidth.

During typical remote computing usage, including web browsing, the host/display network bandwidth will, in many cases, be dominated by the transmission of images with a large number of colors. Examples of such images include, digital photographic images of the natural world, computer-generated images of the natural world, and computer-generated images, which include anti-aliased text or graphics. There are several image compression schemes available such as the Graphics Interchange Format (GIF) from CompuServe Interactive Services, Inc. These alternate compression schemes typically require significant computing power and/or provide poor compression ratios. Additionally, these compression schemes do not achieve optimal compression for images, which are dominated by a small number of frequent colors, but also have a few rare colors, for example, anti-aliased text.

Some remote display applications use RGB image codecs to compress these images for lower-bandwidth transmission. These codecs typically take advantage of spatial coherence in the image to achieve compression. While such RGB image codecs are generally very good at achieving compression, and hence at reducing the bandwidth requirement, they often require a significant amount of computational power. In situations where this computational power may not be available, other compression schemes that might be less efficient at compression but require less computational power are desirable. In addition, RGB image codecs generally achieve good compression at the expense of accuracy; they are often "lossy" (i.e. some image information gets lost during compression). This may be undesirable in some applications.

Image compression is also useful in many applications other than remote computing and data transfer over a network. For example, image compression can effectively reduce the amount of memory required to save an image, whether at a thin client or at a network server.

Hence, what is needed is a method and an apparatus for compressing a digital image to reduce network bandwidth and memory use without requiring a significant amount of computational power.

SUMMARY

One embodiment of the present invention provides a system for compressing an image. During operation, the system determines a set of commonly occurring color values in the image and associates a unique designator with each commonly occurring color value. Next, for each pixel in the image, the system identifies a color value for the pixel. If the pixel has a commonly occurring color value, the system substitutes the associated designator for the commonly occurring color value. Otherwise, if the pixel does not have a commonly occurring color value, the system adds the color value to a rare color list, and substitutes a special designator for the color value to indicate that the color value for the pixel is contained in the rare color list.

In a variation on this embodiment, determining the set of commonly occurring color values involves: determining a frequency for each color value in the image; selecting the set of commonly occurring color values in the image based upon frequency; and then associating a unique designator with each commonly occurring color value.

In a variation on this embodiment, the number of designators is $2^n-1$, wherein n is an integer indicating the number of bits needed to represent the designator.

In a variation on this embodiment, selecting the set of commonly occurring color values involves determining the number of designators to use in encoding the image. More specifically, this involves calculating the total bitcount after compression for each successive number of designators $2^n-1$, where n is an integer indicating the number of bits used to represent the designators, and then selecting the number of designators, $2^n-1$, that minimizes total bitcount of the image after compression.

The method of claim 1, further comprising creating a compressed image wherein the compressed image includes: the number of designators used to compress the image; the size of the image; a color palette containing commonly occurring color values and associated designators; a bitmask containing a designator for each pixel; and the rare color list.

Another embodiment of the present invention provides a system for decompressing a compressed image. This system operates by receiving the compressed image, wherein the compressed image includes: a color palette specifying commonly occurring color values in the image and associated designators for the commonly occurring color values; a bitmask containing designators for each pixel in the image; and a rare color list containing color values that are not commonly occurring color values in the image. Upon receiving the compresses image, the system decodes the compressed image.

In a variation on this embodiment, the compressed image also includes a count of designators associated with the compressed image and a size of the image.

In a variation on this embodiment, decoding the compressed image involves: examining a designator associated with a pixel from the bitmask. If the designator is not a special designator indicating that the color value for the pixel is contained in the rare color list, the system uses the designator to assign a color value to the pixel from the color palette. Otherwise, the system assigns a next color value to the pixel from the rare color list, and then repeats the steps of examining the designator and assigning the color value until an end of the bitmask is reached.

Table 1 illustrates a 16×16 image including four colors in accordance with an embodiment of the present invention.

Table 2 illustrates a 16*16 image in accordance with an embodiment of the present invention.

Definitions

Color value: A number or series of numbers that represent a specific color. An example is a red-green-blue (RGB) encoding that uses eight bits each to represent the levels of red, green, and blue, respectively that comprises a given color.

Designator (or Color Code): A number that represent a specific color value that includes fewer bits than the color value.

Color Palette: A list of color values, wherein each color value corresponds to one color code.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 1:
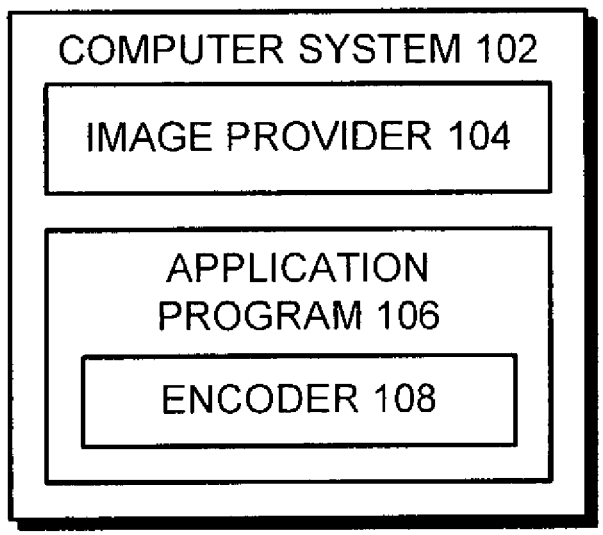
FIG. 1 illustrates computer system 102 in accordance with an embodiment of the present invention.

FIG. 1 illustrates computer system 102 in accordance with an embodiment of the present invention. Computer system 102 includes image provider 104 and application program 106. Application program 106 includes encoder 108.

Image provider 104 can be any process running on computer system 102, which provides images for display or storage. Images from image provider 104 are provided to application program 106 for local or remote display or for local or remote storage.

Application program 106 receives the image from image provider 104 and encodes the image using encoder 108 to reduce the bandwidth required to transmit the image across a network or to store the image in persistent storage. Note that, encoder 108 encodes the image in a manner which reduces the CPU power needed to reconstruct the image.

Table 1 illustrates a 16×16 image with four colors in accordance with an embodiment of the present invention. Each letter in Table 1 represents a single pixel, where the same letter represents pixels of the same color and different letters represents pixels of different colors. The image in Table 1 has four different colors, denoted by "a", "b", "c", and "d". Color values are typically specified using 24 bits or 32 bits in RGB images. The descriptions herein assume 24 bits are used to specify a color. Hence, sending this image without any encoding requires 16×16×24 bits=6144 bits.

TABLE 1

| | | | | | | | | | | | | | | | |
|---|---|---|---|---|---|---|---|---|---|---|---|---|---|---|---|
| a | a | a | a | a | a | a | a | b | b | b | b | b | b | b | b |
| a | a | a | a | a | a | b | b | b | b | b | b | b | b | b | b |
| a | a | a | a | a | a | b | b | b | b | b | b | b | b | b | b |
| a | a | a | a | b | b | b | b | b | b | b | b | b | c | c | c |
| a | a | a | a | b | b | b | b | b | b | b | b | b | c | c | c |
| a | a | a | a | b | b | b | b | b | b | b | c | c | c | c | c |
| a | a | a | a | b | b | b | b | b | b | b | c | c | c | c | c |
| a | a | a | a | b | b | b | b | b | b | b | c | c | c | c | c |
| a | a | a | a | b | b | b | b | b | b | b | c | c | c | c | c |
| a | a | a | a | b | b | b | b | b | c | c | c | c | c | c | c |
| a | a | a | a | b | b | b | b | b | c | c | c | c | c | c | c |
| a | a | a | a | b | b | b | b | b | c | c | c | c | c | c | c |
| a | a | a | a | b | b | b | b | b | c | c | c | c | c | c | c |
| d | d | d | d | b | b | b | b | b | c | c | c | c | c | c | c |
| d | d | d | d | d | d | d | b | b | c | c | c | c | c | c | c |
| d | d | d | d | d | d | d | b | b | c | c | c | c | c | c | c |

Using the well-known N-color encoding, the color palette includes the four colors "a", "b", "c", and "d". Each pixel is then represented by one of the four 2-bit values 00, 01, 10, or 11. If, for example, 00 represents color "a", 01 color "b", 10 color "c", and 11 color "d", the top row of example 1 would be encoded as:

00 00 00 00 00 00 00 00 01 01 01 01 01 01 01 01, and
the last row of example 1 would be encoded as:
11 11 11 11 11 11 11 11 01 01 10 10 10 10 10 10.

When using this encoding scheme, only two bits per pixel are needed. Assuming no further compression, the total number of bits needed to encode the image is:

```
      4 * 24  (the color palette)
+ (16 * 16) * 2  (2 bits for each pixel)
─────────────
    608  (total number of bits).
```

This results in a reduction of 5536 bits when compared against the unencoded image.

The bits that represent the pixels are typically referred to as the "bitmask". In Table 1, the bitmask includes 16*16*2 bits. An image compressed using the N-color encoding has three parts: (1) the number of designators, (2) the color palette, and (3) the bitmask.

The N-color encoding scheme has a maximum number, N-max, of colors that it supports. The scheme fails if an image contains more than N-max colors. This is true even if only a single pixel has a value other than the N-max colors. In anti-aliased graphics, it is often the case that over 90 percent of the pixels in the image contain a limited number of colors, while the remaining less than 10 percent of the pixels contain many different colors. For images with less than N-max colors, the N-color scheme can lead to suboptimal compression if some of the colors are "rare".

Table 2 illustrates a 16*16 image in accordance with an embodiment of the present invention.

TABLE 2

| a | a | a | a | a | a | a | a | a | a | a | a | a | a | a | a |
|---|---|---|---|---|---|---|---|---|---|---|---|---|---|---|---|
| a | a | a | a | a | a | a | a | a | a | a | a | a | a | a | a |
| a | a | a | a | a | a | a | a | a | a | a | a | a | a | a | a |
| a | a | X | a | a | a | a | a | a | a | a | a | a | a | a | a |
| a | a | a | a | a | a | a | a | a | a | a | a | a | a | a | a |
| a | a | a | a | a | a | a | a | Y | a | a | a | a | a | a | a |
| a | a | a | a | a | a | a | a | a | a | a | a | a | a | a | a |
| a | a | a | a | a | a | a | a | a | a | a | a | a | a | a | a |
| b | b | b | b | b | b | b | b | b | b | b | b | b | b | b | b |
| b | b | b | b | b | b | b | b | b | b | b | b | b | b | b | b |
| b | b | b | b | b | b | b | b | b | b | b | b | b | b | b | b |
| b | b | b | b | b | b | b | b | b | b | b | b | b | b | b | b |
| b | b | b | b | b | b | b | b | b | b | b | b | b | b | b | b |
| b | b | b | Z | b | b | b | b | b | b | b | b | b | b | b | b |
| b | b | b | b | b | b | b | b | b | b | b | b | b | b | b | b |
| b | b | b | b | b | b | b | b | b | b | b | b | b | b | b | b |

The image in Table 2 has five different colors: "a", "b", "X", "Y", and "Z". The latter three colors appear only once each. The N-color scheme would fail here if N-max is four. For example, if "a", "b", "X", and "Y" are chosen as the color palette, a single pixel, the pixel of color "Z", would make the scheme unusable.

The present invention extends the N-color encoding by allowing up to a certain percentage of pixels to be of colors other that the N-max palette colors. Whereas images compressed using the N-color encoding have three parts (the number of designators, the color palette and the bitmask), images compressed using the present invention have four parts: (1) the number of designators, (2) the color palette, (2) the bitmask, and (3) a list of rare colors.

Considering Table 2 again, the system encodes the image using the three most common colors that are contained in the color palette. Thus, the color palette represents pixels with the following codes:

00 represents "a",
01 represents "b",
10 represents "X", and
11 represents "other colors".

The rare color list then includes the color "Y" followed by the color "Z" in this example, the colors "X", "Y", and "Z" have the same frequency. The choice of color "X" as a color palette color over the other two is arbitrary. The total number of bits needed to encode this image with this scheme is:

```
      3 * 24  (the color palette)
+ (16 * 16) * 2  (2 bits for each pixel)
    + 2 * 24  (the rare color list)
─────────────
    632  (total number of bits).
```

Encoding an image in this manner is described more fully in conjunction with FIGS. 3 and 4 below. If this image were to be compressed using the N-color scheme (using three bits to represent each pixel), the total number of bits would be 888:

```
      5 * 24  (the color palette)
+ (16 * 16) * 3  (3 bits for each pixel)
─────────────
    888  (total number of bits).
```

Figure 2:
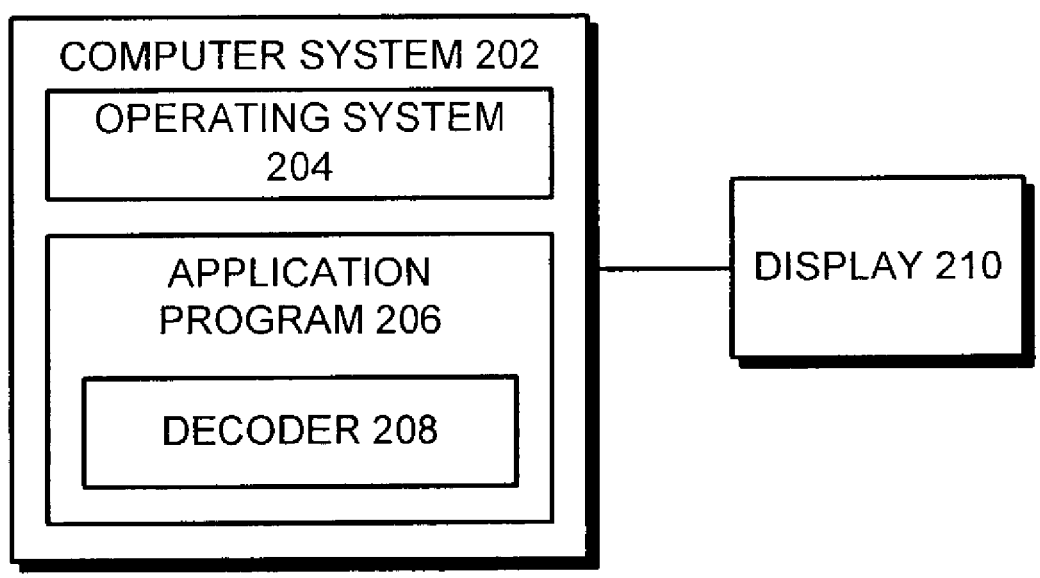
FIG. 2 illustrates computer system 202 in accordance with an embodiment of the present invention.

FIG. 2 illustrates computer system 202 in accordance with an embodiment of the present invention. Computer system 202 includes operating system 204 and application program 206. Application program 206 includes decoder 208. Display 210 is coupled to computer system 202 to display the decoded images. Note that display 210 may be integral to computer system 202 as in a personal digital assistant (PDA) or may be a separate display device. Note also that the image may be stored in a storage device rather than being displayed.

Operating system 204 controls the operation of computer system 202 and provides an interface between application program 206 and display 210. Application program 206 provides a desired service to a user (not shown) and receives compressed images from a network or from storage. Decoder 208 decompresses the images received from by application program 206.

During the decoding process, decoder 208 examines the bitmask for the compressed image and restores the proper color for each pixel. For example, consider the encoding described above for Table 2. Each time decoder 208 encounters the code 00 in the bitmask, decoder 208 provides color "a" for the display. Likewise, decoder 208 provides color "b" for code 01 and color "X" for code 10. When decoder 208 encounters code 11, however, decoder 208 provides the next color in the rare color list. For example, in the encoding for Table 2, the first time code 11 is encountered the provided color is "Y" and the second time the provided color is "Z".

Compressing an Image

Figure 3:
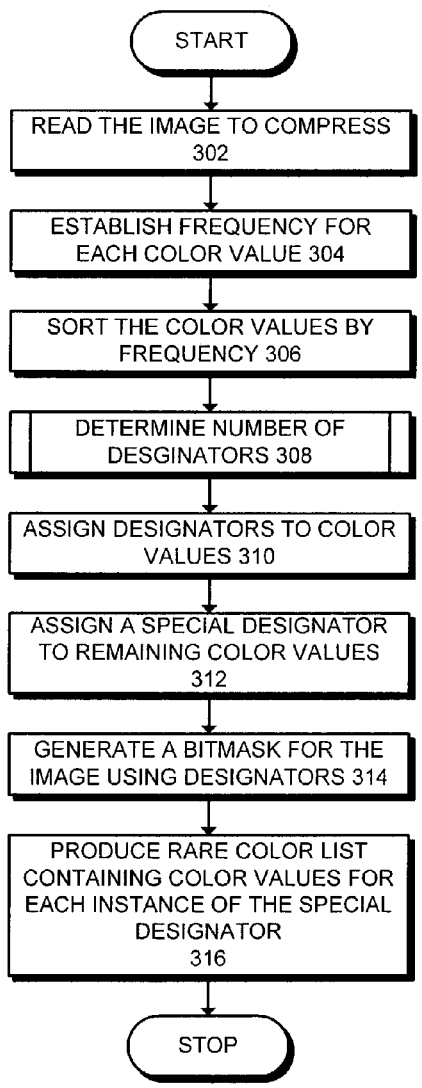
FIG. 3 is a flowchart illustrating the process of compressing an image in accordance with an embodiment of the present invention.

FIG. 3 is a flowchart illustrating the process of compressing an image in accordance with an embodiment of the present invention. The system starts when an image is read for compression (step 302). Next, the system scans the image examining each pixel's color to establish the frequency for each color value in the image (step 304). The color values are then sorted by frequency (step 306). Next, the system determines the number of designators to use to compress the image (step 308). The process of determining the number of designators is described in more detail in conjunction with FIG. 4 below.

The system then associates the designators with specific color values (step 310). The system also associates a special designator with remaining color values (step 312). Next, the system generates a bitmask of the image using the designators (step 314). Finally, the system adds an entry to the rare color list for each occurrence of the special designator to the bitmask (step 316).

Determining the Number of Bits for the Designator

Figure 4:
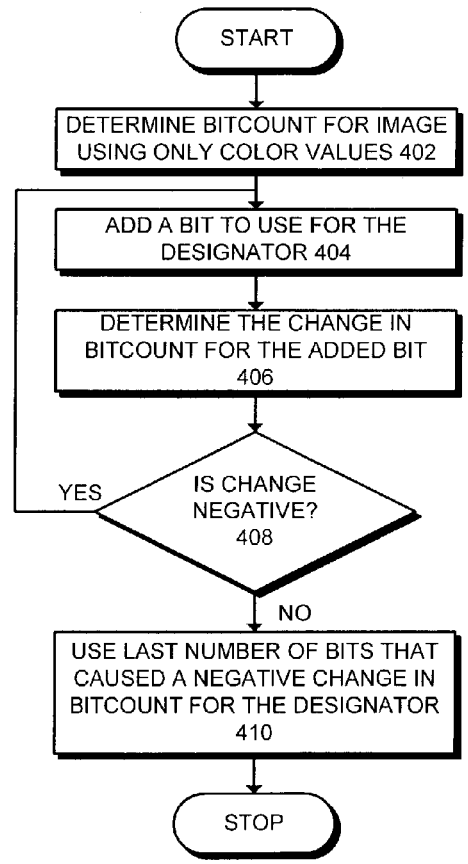
FIG. 4 is a flowchart illustrating the process of determining the number of bits to use for a designator in order to maximize the compression in accordance with an embodiment of the present invention.

FIG. 4 is a flowchart illustrating the process of determining the number of bits to use for a designator in order to maximize the compression in accordance with an embodiment of the present invention. The system starts by determining a bitcount for the image using only the color values (step 402). The term "bitcount" refers to the total number of bits required to transmit or store an image.

Next, the system tries different sizes of designators to see which size results in the best compression. Note that a designator of size n can encode $2^n - 1$ designators and one special designator. The system tries different sizes of designators by iteratively adding one bit to the designator (step 404). The system then determines the change in bitcount as a result of the added bit (step 406). If the change in bitcount is negative, indicating an improvement in compression, the process returns to step 404 to add another bit to the designator. If the change in bitcount is positive at step 408 indicating a reversal of the improvement, the system uses the last number of bits that caused a negative change in the bitcount for the designator (step 410).

For example, consider an image that has 2000 pixels and wherein the frequency count of color values has produced the following frequencies for the seven most frequent colors:
color "a": 287,
color "b": 182,
color "c": 129,
color "d": 98,
color "e": 92,
color "f": 77, and
color "g": 73.

Using no compression and using 24 bits for each pixel, the image requires 48,000 bits.

$$\underline{2000 * 24} \text{ (24 bits per pixel)}$$
$$48000 \text{ (total number of bits).}$$

Using a single bit for a designator allows the most used color, color "a" to be represented with a code of 0 in the bitmask, while all other colors are represented with a code of 1 in the bitmask. The following calculation shows the total number of compressed bits required if a one-bit designator is chosen:

$$\begin{aligned} &1 * 24 \text{ (the color palette)}\\ &+ 2000 * 1 \text{ (1 bit for each pixel)}\\ &\underline{+ (2000 - 287) * 24} \text{ (the rare color list)}\\ &43136 \text{ (total number of bits).} \end{aligned}$$

This is a savings of 4864 bits. An alternative method of determining the net change in bits is as follows. The increase in bits for adding one bit to the designator is:

$$\begin{aligned} &1 * 24 \text{ (additional color palette colors)}\\ &\underline{+ 2000 * 1} \text{ (1 bit for each pixel)}\\ &2024 \text{ (total increase in bits).} \end{aligned}$$

and the decrease in bits for adding one bit to the designator is:

$$\underline{287 * 24} \text{ (number of pixels of color "a")}$$
$$6888 \text{ (total decrease in bits).}$$

As long as the decrease in bits is larger than the increase in bits, the system continues to add bits to the designator. When the increase in bits becomes greater than the decrease in bits, the system uses the last number of bits for the designator that caused a net decrease in bits.

Continuing with the above technique, using a two-bit designator size increases the number of bits in the bitmask by 2048, ((2*24)+2000), and reduces the number of bits in the bitmask by 7464, ((182+129)*24). Using a three-bit designator size increases the number of bits in the bitmask by 2096=((4*24)+2000), bits and reduces the number of bits in the bitmask by 8160=((98+92+77+73)*24), bits. The system continues in this manner until the net change in bits is an increase. At this point, the system uses the last number of bits that caused a net decrease for the number of bits in the designator. An alternate technique is to compute the bitcount for each possible number of bits and select the encoding with the least bitcount.

Decompressing an Image

Figure 5:
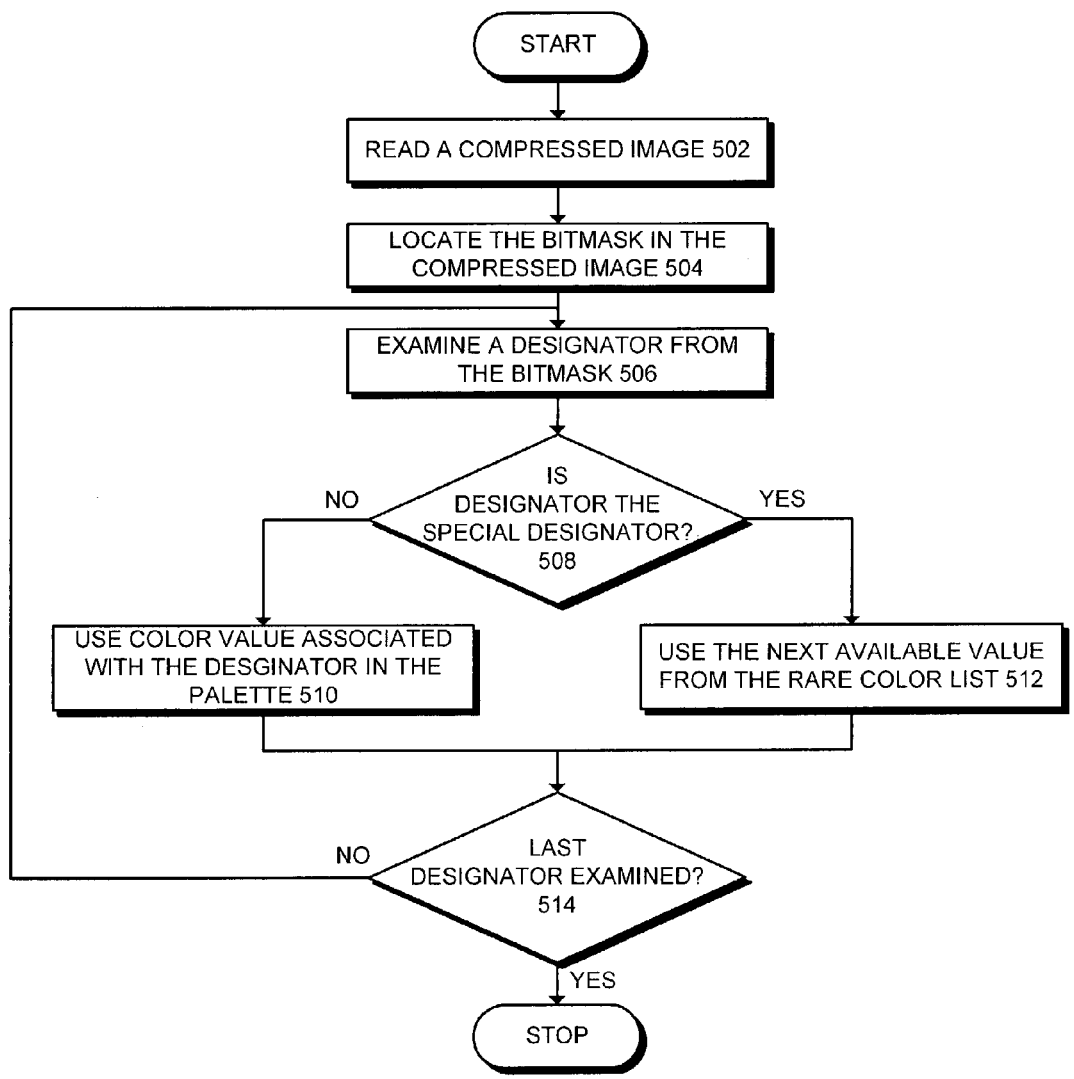
FIG. 5 is a flowchart illustrating the process of decompressing an image in accordance with an embodiment of the present invention.

FIG. 5 is a flowchart illustrating the process of decompressing an image in accordance with an embodiment of the present invention. The system starts when computer system 202 reads a compressed image (step 502). Next, computer system 202 locates the bitmask in the compressed image (step 504).

Decoder 208 within computer system 202 then examines a designator from the bitmask (step 506). In doing so, decoder 208 determines whether the designator is the special designator indicating that the corresponding color value is contained in the rare color list (step 508). If not, decoder 208 uses the color value associated with the designator in the color palette (step 510). If the designator is the special designator at step 508, decoder 208 uses the next available value from the rare color list (step 512). After determining the color for a pixel, decoder 208 determines if the last designator in the bitmask has been examined (step 514). If not, the process returns to step 506 to examine another designator from the bitmask. Otherwise, the process is terminated.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for compressing an image, comprising:
   determining a set of commonly occurring color values in the image and a associating a unique designator with each commonly occurring color value;
   for each pixel in the image,
      identifying a color value for the pixel,
      if the pixel has a commonly occurring color value, substituting the associated designator for the commonly occurring color value, and
      if the pixel does not have a commonly occurring color value, adding the color value to a rare color list, and substituting a special designator for the color value to indicate that the color value for the pixel is contained in the rare color list; and
   storing the image in compressed format.

2. The method of claim 1, wherein determining the set of commonly occurring color values involves:
   determining a frequency for each color value in the image;
   selecting the set of commonly occurring color values in the image based upon frequency; and
   associating a unique designator with each commonly occurring color value.

3. The method of claim 1, wherein the number of designators is $2^n-1$, wherein n is an integer indicating the number of bits needed to represent the designator.

4. The method of claim 1, wherein selecting the set of commonly occurring color values involves determining the number of designators to use in encoding the image;
   wherein determining the number of designators to use involves calculating the total bitcount after compression for each successive number of designators $2^n-1$, where n is an integer indicating the number of bits used to represent the designators, and then selecting the number of designators, $2^n-1$, that minimizes total bitcount of the image after compression.

5. The method of claim 1, further comprising creating a compressed image wherein the compressed image includes:
   the number of designators used to compress the image and the size of the image;
   a color palette containing commonly occurring color values and associated designators;
   a bitmask containing a designator for each pixel; and
   the rare color list.

6. A method for decompressing a compressed image, comprising:
   receiving the compressed image;
   wherein the compressed image includes:
      a color palette specifying commonly occurring color values in the image and associated designators for the commonly occurring color values,
      a bitmask containing designators for each pixel in the image, and
      rare color list containing color values that are not commonly occurring color values in the image; and
      decoding the compressed image.

7. The method of claim 6, wherein the compressed image also includes a count of designators associated with the compressed image and a size of the image.

8. The method of claim 6, wherein decoding the compressed image involves:
   examining a designator associated with a pixel from the bitmask;
   if the designator is not a special designator indicating that the color value for the pixel is contained in the rare color list, using the designator to assign a color value to the pixel from the color palette;
   otherwise, assigning a next color value to the pixel from the rare color list; and
   repeating the steps of examining the designator and assigning the color value until an end of the bitmask is reached.

9. A computer-readable storage medium storing instructions that when executed by a computer cause the computer to perform a method for compressing an image, wherein the computer-readable storage medium includes magnetic and optical storage devices, disk drives, magnetic tape, CDs (compact discs), and DVDs (digital versatile discs or digital video discs), the method comprising:
   determining a set of commonly occurring color values in the image and associating a unique designator with each commonly occurring color value;
   for each pixel in the image,
      identifying a color value for the pixel,
      if the pixel has a commonly occurring color value, substituting the associated designator for the commonly occurring color value, and
      if the pixel does not have a commonly occurring color value, adding the color value to a rare color list, and substituting a special designator for the color value to indicate that the color value for the pixel is contained in the rare color list; and
   storing the image in compressed format.

10. The computer-readable storage medium of claim 9, wherein determining the set of commonly occurring color values involves:
    determining a frequency for each color value in the image;
    selecting the set of commonly occurring color values in the image based upon frequency; and
    associating a unique designator with each commonly occurring color value.

11. The computer-readable storage medium of claim 9, wherein the number of designators is $2^n-1$, wherein n is an integer indicating the number of bits needed to represent the designator.

12. The computer-readable storage medium of claim 9, wherein selecting the set of commonly occurring color values involves determining the number of designators to use in encoding the image;
wherein determining the number of designators to use involves calculating the total bitcount after compression for each successive number of designators $2^n-1$, where n is an integer indicating the number of bits used to represent the designators, and then selecting the number of designators, $2^n-1$, that minimizes total bitcount of the image after compression.

13. The computer-readable storage medium of claim 9, wherein the method further comprises creating a compressed image wherein the compressed image includes:
the number of designators used to compress the image and the size of the image;
a color palette containing commonly occurring color values and associated designators;
a bitmask containing a designator for each pixel; and
the rare color list.

14. A computer-readable storage medium storing instructions that when executed by a computer cause the computer to perform a method for decompressing a compressed image, wherein the computer-readable storage medium includes magnetic and optical storage devices, disk drives, magnetic tape, CDs (compact discs), and DVDs (digital versatile discs or digital video discs), the method comprising:
receiving the compressed image;
wherein the compressed image includes:
a color palette specifying commonly occurring color values in the image and associated designators for the commonly occurring color values,
a bitmask containing designators for each pixel in the image, and
a rare color list containing color values that are not commonly occurring color values in the image; and
decoding the compressed image.

15. The computer-readable storage medium of claim 14, wherein the compressed image also includes a count of designators associated with the compressed image and a size of the image.

16. The computer-readable storage medium of claim 14, wherein decoding the compressed image involves:
examining a designator associated with a pixel from the bitmask;
if the designator is not a special designator indicating that the color value for the pixel is contained in the rare color list, using the designator to assign a color value to the pixel from the color palette;
otherwise, assigning a next color value to the pixel from the rare color list; and
repeating the steps of examining the designator and assigning the color value until an end of the bitmask is reached.

17. An apparatus for compressing an image, comprising:
a determination mechanism configured to determine a set of commonly occurring color values in the image and to associate a unique designator with each commonly occurring color value; and
a designator assignment mechanism, wherein for each pixel in the image, the designator assignment mechanism is configured to,
identify a color value for the pixel,
if the pixel has a commonly occurring color value, to substitute the associated designator for the commonly occurring color value, and
if the pixel does not have a commonly occurring color value, to add the color value to a rare color list, and to substitute a special designator for the color value to indicate that the color value for the pixel is contained in the rare color list.

18. The apparatus of claim 17, wherein the determination mechanism is configured to:
determine a frequency for each color value in the image;
select the set of commonly occurring color values in the image based upon frequency; and to
associate a unique designator with each commonly occurring color value.

19. The apparatus of claim 17, wherein the number of designators is $2^n-1$, wherein n is an integer indicating the number of bits needed to represent the designator.

20. The apparatus of claim 17, wherein the designator assignment mechanism is configured to determine the number of designators to use in encoding the image by calculating the total bitcount after compression for each successive number of designators $2^n-1$, where n is an integer indicating the number of bits used to represent the designators, and then selecting the number of designators, $2^n-1$, that minimizes total bitcount of the image after compression.

21. The apparatus of claim 17, further comprising an image assembly mechanism configured to assemble a compressed image, wherein the compressed image includes:
the number of designators used to compress the image and the size of the image;
a color palette containing commonly occurring color values and associated designators;
a bitmask containing a designator for each pixel; and
the rare color list.

22. An apparatus for decompressing a compressed image, comprising:
a receiving mechanism configured to receive the compressed image;
wherein the compressed image includes:
a color palette specifying commonly occurring color values in the image and associated designators for the commonly occurring color values,
a bitmask containing designators for each pixel in the image, and
a rare color list containing color values that are not commonly occurring color values in the image; and
a decoder configured to decode the compressed image.

23. The apparatus of claim 22, wherein the compressed image also includes a count of designators associated with the compressed image and a size of the image.

24. The apparatus of claim 22 wherein for each pixel in the bitmask, the decoder is configured to:
examine a designator associated with a pixel from the bitmask;
if the designator is not a special designator indicating that the color value for the pixel is contained in the rare color list, to use the designator to assign a color value to the pixel from the color palette; and p1 otherwise, to assign a next color value to the pixel from the rare color list.

* * * * *

UNITED STATES PATENT AND TRADEMARK OFFICE
CERTIFICATE OF CORRECTION

PATENT NO. : 7,164,792 B2 Page 1 of 1
APPLICATION NO. : 10/386745
DATED : January 16, 2007
INVENTOR(S) : Tarik Ono et al.

It is certified that error appears in the above-identified patent and that said Letters Patent is hereby corrected as shown below:

In claim 24 (at column 12, line 63), please delete the term, "p1".

Signed and Sealed this

Twenty-seventh Day of March, 2007

JON W. DUDAS
*Director of the United States Patent and Trademark Office*